United States Patent
Takeshita

(10) Patent No.: US 8,329,249 B2
(45) Date of Patent: Dec. 11, 2012

(54) MAGNETIC RECORDING MEDIUM, MAGNETIC RECORDING AND REPRODUCING DEVICE WITH MAGNETIC RECORDING MEDIUM, AND MAGNETIC-RECORDING-MEDIUM MANUFACTURING METHOD

(75) Inventor: Hiroto Takeshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 58 days.

(21) Appl. No.: 12/402,032

(22) Filed: Mar. 11, 2009

(65) Prior Publication Data

US 2009/0305082 A1    Dec. 10, 2009

(30) Foreign Application Priority Data

Jun. 4, 2008    (JP) ................................. 2008-147129

(51) Int. Cl.
C23C 14/00    (2006.01)
G11B 5/00    (2006.01)
G11B 9/00    (2006.01)

(52) U.S. Cl. ........ 427/130; 427/127; 427/128; 427/131; 427/523

(58) Field of Classification Search .......... 427/127–131, 427/523
See application file for complete search history.

(56) References Cited

U.S. PATENT DOCUMENTS

| 4,281,396 A | * | 7/1981 | Roos ................................ 365/29 |
| 6,420,058 B1 | | 7/2002 | Haratani et al. |
| 6,753,043 B1 | * | 6/2004 | Kuo et al. ..................... 427/526 |
| 6,838,227 B2 | * | 1/2005 | Wang et al. .................... 430/320 |
| 2003/0072971 A1 | | 4/2003 | Fukutani et al. |
| 2004/0259036 A1 | | 12/2004 | Chappert et al. |
| 2005/0271819 A1 | * | 12/2005 | Wago et al. ..................... 427/259 |
| 2006/0222898 A1 | * | 10/2006 | Ichihara ....................... 428/826 |
| 2009/0180213 A1 | | 7/2009 | Fukushima et al. |

FOREIGN PATENT DOCUMENTS

| JP | A 3-22211 | 1/1991 |
| JP | 03-254421 | 11/1991 |
| JP | 07-141641 | 6/1995 |
| JP | 2000-306227 | 11/2000 |
| JP | 2002-501300 | 1/2002 |
| JP | 2003-196815 | 7/2003 |
| JP | 2007-226862 | 9/2007 |

OTHER PUBLICATIONS

Japanese Office Action mailed Apr. 10, 2012 for corresponding Japanese Application No. 2008-147129, with English-language translation.

* cited by examiner

Primary Examiner — Timothy Meeks
Assistant Examiner — Mandy Louie
(74) Attorney, Agent, or Firm — Fujitsu Patent Center

(57) ABSTRACT

Although dots and servo patterns are made of the same magnetic material, the dots have a relatively low coercive force so as to allow data deletion and rewrite by a magnetic head, while the servo patterns have a high coercive force compared with the coercive force of the dots. The coercive force of the servo patterns is strong enough so as to eliminate the influence of shape magnetic anisotropy.

6 Claims, 11 Drawing Sheets

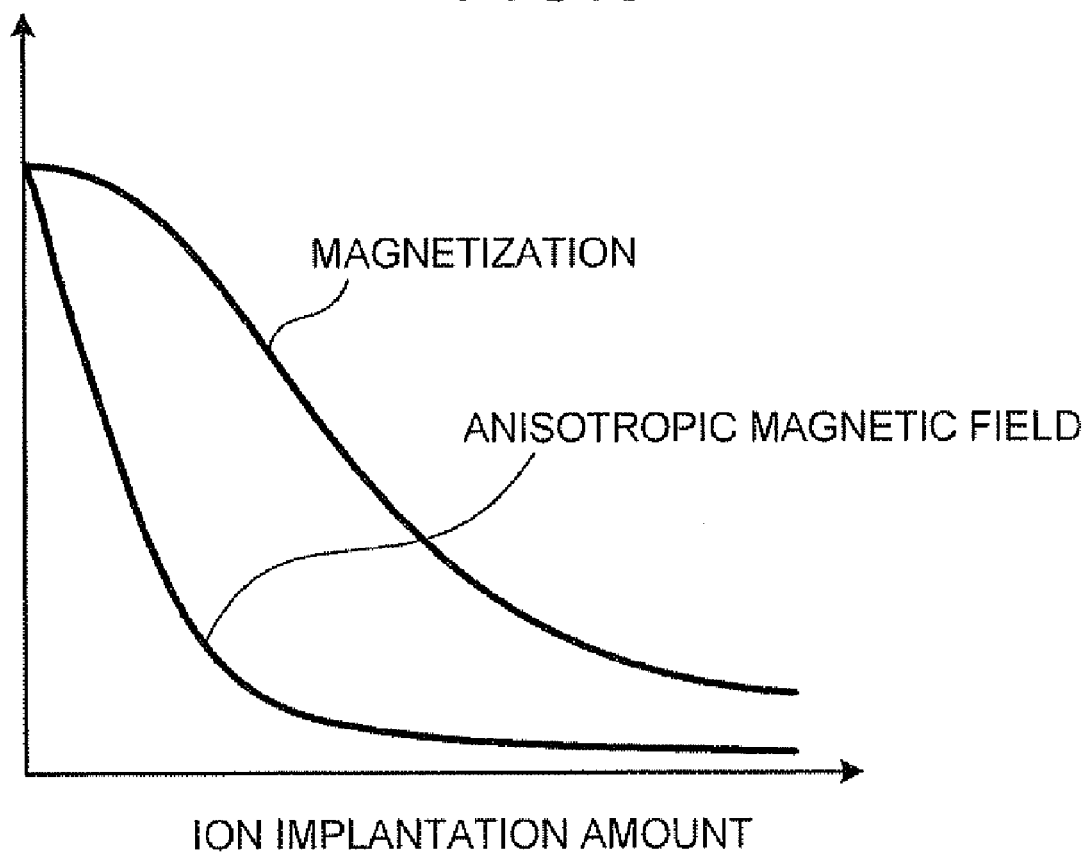

MAGNETIC RECORDING MEDIUM, MAGNETIC RECORDING AND REPRODUCING DEVICE WITH MAGNETIC RECORDING MEDIUM, AND MAGNETIC-RECORDING-MEDIUM MANUFACTURING METHOD

CROSS-REFERENCE TO RELATED APPLICATION

This application is based upon and claims the benefit of priority of the prior Japanese Patent Application No. 2008-147129, filed on Jun. 4, 2008, the entire contents of which are incorporated herein by reference.

FIELD

The embodiments discussed herein are directed to a magnetic recording medium processed so that magnetic materials are separated by a non-magnetic material, a magnetic recording and reproducing device including the magnetic recording medium, and a method of manufacturing the magnetic recording medium.

BACKGROUND

In recent years, as magnetic recording media included in magnetic recording and reproducing devices, such as Hard Disk Drives (HDDs), patterned media attract attention (for example, refer to Japanese Patent No. 1888363). Unlike a conventional magnetic recording medium in which crystal grains made of a magnetic material are laid over a disk surface, the patterned medium is a magnetic recording medium processed so that magnetic materials are separated from each other with a non-magnetic material.

As with the conventional medium, the patterned medium includes a data region where data is read and write and a servo region where information for registering a magnetic head is written. However, the magnetic shape in the data region and the shape of the magnetic material in the servo region are different from each other. In general, the shape of each dot made of a magnetic material in the data region is approximately near a cube, whilst the shape of each servo pattern made of a magnetic material in the servo region is a rectangular parallelepiped longer than the shape of the dot.

Meanwhile, when a vertical magnetic recording technique is used as a recording technique for the patterned media, magnetization of the dots and the servo patterns has to be in a direction vertical to a disk surface. However, the shape of the servo patterns is strongly affected by shape magnetic anisotropy compared with crystal magnetic anisotropy, making it difficult to keep magnetization in a vertical direction.

To solve this problem, the servo patterns are required to have a strong coercive force enough so as to eliminate the influence of shape magnetic anisotropy. However, if a strong coercive force is provided also to the dots, it becomes difficult to delete or rewrite data by the magnetic head.

To achieve a patterned medium with contradictory properties, different magnetic materials can be used between the servo patterns and the dots. In this case, however, the manufacturing procedure is complicated, and the cost increases.

SUMMARY

According to an aspect of the invention, a magnetic recording medium includes: dots made of a magnetic material and formed in data regions, each dot having a degree of coercive force allowing data rewrite; and servo patterns made of the magnetic material and formed in servo regions, each servo pattern having a crystal magnetic anisotropy stronger than a crystal magnetic anisotropy of the dots, the dots and the servo patterns being separated by a non-magnetic material.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a drawing of a relation between the amount of ions implanted to a magnetic material and the anisotropic magnetic field of the magnetic material and a relation between the amount of ions and magnetization;

DESCRIPTION OF EMBODIMENTS

Preferred embodiments of the present invention will be explained with reference to accompanying drawings.

[a] First Embodiment

Figure 1:
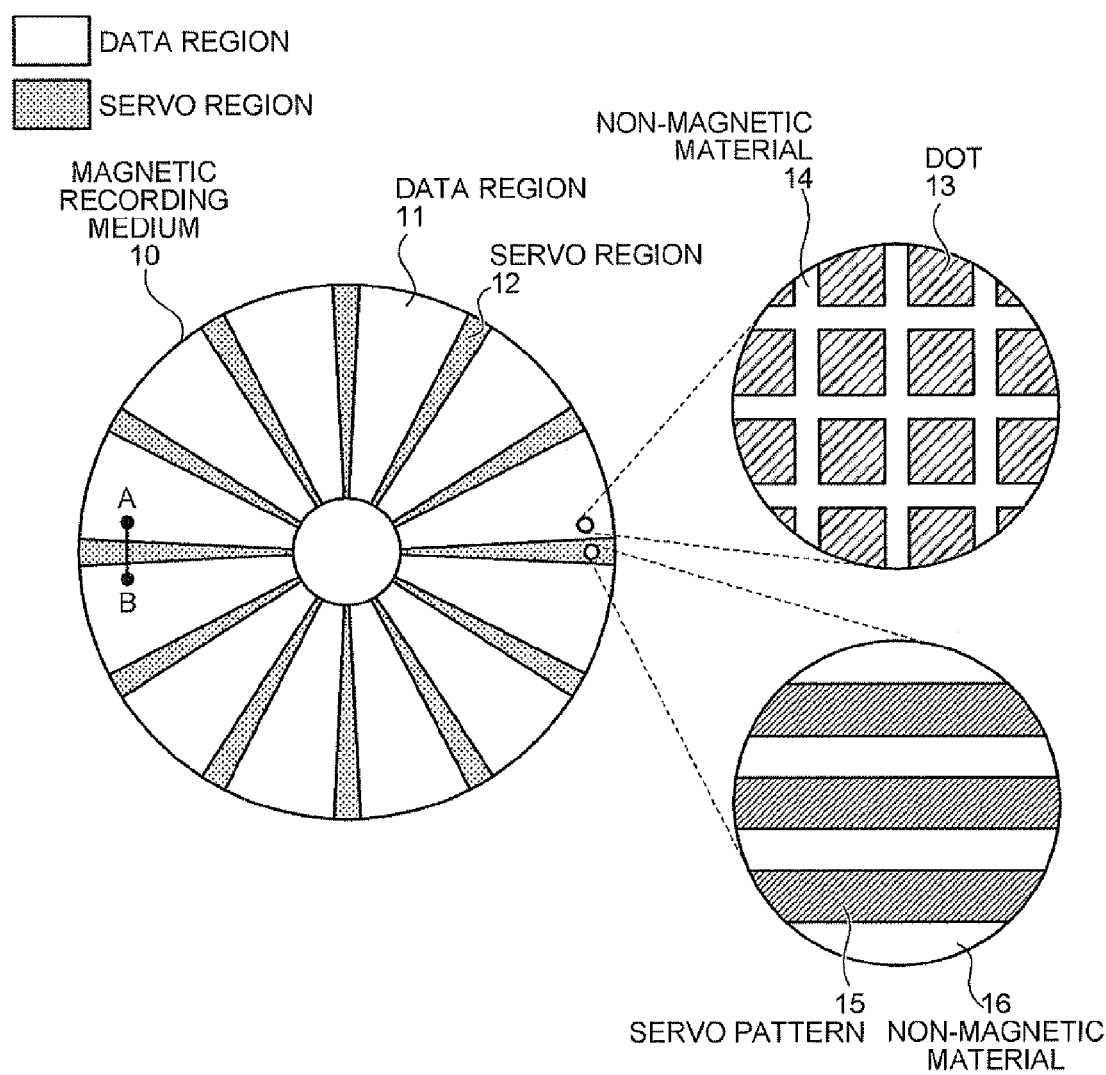
FIG. 1 is a drawing for explaining a general outline of a magnetic recording medium manufactured based on a magnetic-recording-medium manufacturing method according to the present invention.

First, a magnetic recording medium according to a first embodiment of the present invention is explained by using FIG. 1. FIG. 1 is a drawing for explaining a general outline of a magnetic recording medium manufactured based on a magnetic-recording-medium manufacturing method according to the present invention.

As depicted in FIG. 1, a magnetic recording medium 10 includes data regions 11 where data is read and written and servo regions 12 in which information for controlling the position of a magnetic head is written in an alternating manner. Each data region 11 has dots 13 each approximately shaped in a cube and regularly disposed with a predetermined space. The dots 13 are each formed of one magnetic grain, or formed of an aggregate of magnetic grains magnetically strongly bonded together. The data region 11 is processed so that the portions other than the dots 13 become a non-magnetic material 14. On the other hand, the servo regions 12 each have servo patterns 15 each having a rectangular parallelepiped shaped longer than the dots 13 regularly disposed with a predetermined space. The servo patterns 15 are each formed of one magnetic grain or formed of an aggregate of magnetic grains magnetically strongly bonded together. The servo regions 12 are processed so that the portions other than the servo patterns 15 become a non-magnetic material 16. In the magnetic recording medium 10, these dots 13 and servo patterns 15 are formed of the same magnetic material.

In the magnetic recording medium 10, magnetic recording is performed onto the dots 13 and the servo patterns 15 with a vertical magnetic recording technique. In the vertical magnetic recording technique, the dots 13 and the servo patterns 15 are required to be stably magnetized in a direction vertical to the surface of the magnetic recording medium 10.

In the magnetic recording medium 10, although the dots 13 and the servo patterns 15 are formed of the same magnetic material, the dots 13 have a relatively low coercive force so as to allow data deletion and rewrite by a magnetic head, whilst the servo patterns 15 have a high crystal magnetic anisotropy compared with the coercive force of the dots. The crystal magnetic anisotropy is strong enough to make the influence of shape magnetic anisotropy of the servo patterns 15 trivial.

As a result, the servo patterns 15 have strong shape magnetic anisotropy compared with the dots 13, but can keep the magnetizing direction vertical to the surface of the magnetic recording medium 10. Also, since the dots 13 and the servo patterns 15 are formed of the same magnetic material, the manufacturing procedure can be simplified.

The magnetic recording medium according to a first embodiment is as explained above. In the following, a cross section of the magnetic recording medium 10 depicted in FIG. 1 along a line segment AB is explained in the manufacturing order, thereby explaining a method of manufacturing the magnetic recording medium 10 according to the first embodiment.

Figure 2A:
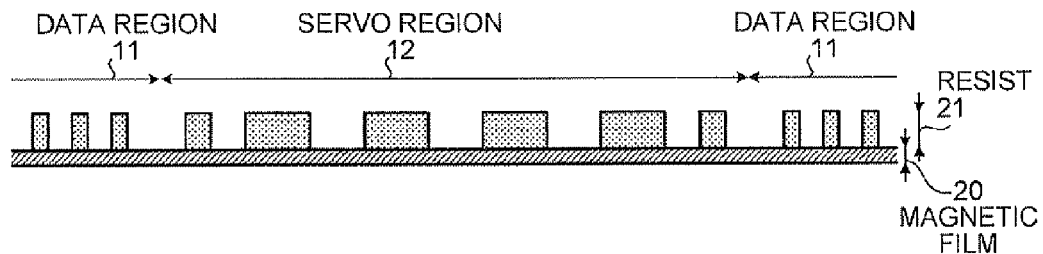
FIG. 2A is a drawing of a cross section of a magnetic recording medium at a stage where a resist is formed on a magnetic film.

FIG. 2A is a drawing of a cross section of the magnetic recording medium 10 at a stage where a resist 21 is formed on a magnetic film 20. As explained above, the cross section of the magnetic recording medium 10 along the line segment AB depicted in FIG. 1 is schematically depicted, where the left side corresponds to a point A, whilst the right side corresponds to a point B. The same goes for other cross sections of the magnetic recording medium 10.

As depicted in FIG. 2A, the magnetic recording medium 10 has the magnetic film 20 formed thereon. The magnetic recording medium 10 is formed of a back layer, an intermediate layer, a recording layer, a protective film, a lubricating film, and others. With the magnetic film 20, the recording film is formed. As a magnetic material for the magnetic film 20, if the servo patterns 15 depicted in FIG. 1 are formed, a material is used that allows crystal magnetic anisotropy high enough to stably magnetize the servo patterns 15 on the surface of the magnetic recording medium 10. As depicted in FIG. 1, the line segment AB starts from the point A in the data region 11, passes through the servo region 12, and the point B in another data region 11. At the time when the magnetic film 20 is formed, sections as the data regions 11 or the servo regions 12 are not determined.

On this magnetic film 20, a resist 21 is formed. The resist 21 is shaved in a subsequent manufacturing process in place of the magnetic film. The resist 21 is formed through, for example, nano-imprint lithography. Onto the resist uniformly formed on the magnetic film 20, an asperity pattern formed with a mold for imprint or a disk is transferred. At the time of forming the resist 21, ranges depicted in FIG. 2A are determined as sections of the data regions 11 or the servo regions 12.

Figure 2B:
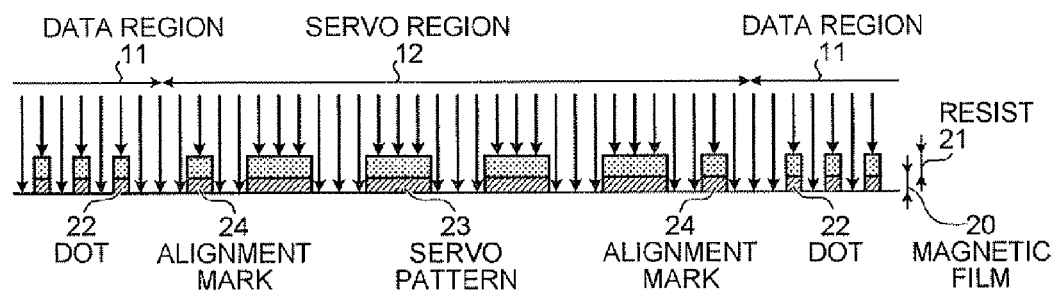
FIG. 2B is a drawing of the cross section of the magnetic recording medium at a stage where dots and servo patterns are formed.

FIG. 2B is a drawing of the cross section of the magnetic recording medium 10 at a stage where dots and servo patterns are formed. As depicted in FIG. 2B, the magnetic recording medium 10 having the resist formed on the magnetic film is subjected to ion milling, reactive ion etching, or the like, thereby physically and chemically shaving a portion of the magnetic film 20 where the resist 21 is not formed. As a result, a portion of the magnetic film 20 where the resist 21 is formed is left. In the data region 11, the left magnetic film 20 becomes the dots 22, whilst, in the servo region 12, the left magnetic film 20 becomes the servo pattern 23. Also, in the servo region 12, alignment marks 24 are formed separately from the servo pattern 23. The alignment marks 24 will be used in a subsequent process, and will be explained further below.

Figure 2C:
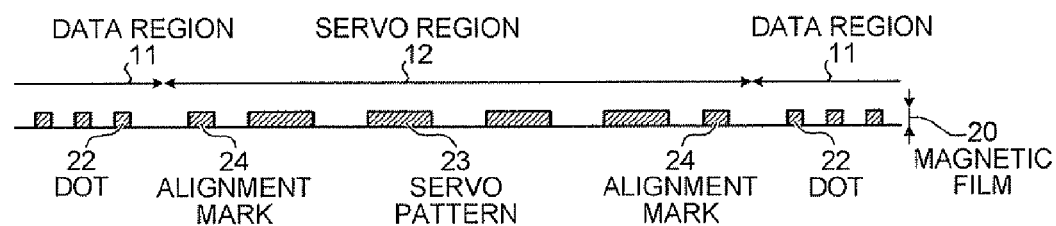
FIG. 2C is a drawing of the cross section of the magnetic recording medium at a stage where the resist is removed.

FIG. 2C is a drawing of the cross section of the magnetic recording medium 10 at a stage where the resist 21 is removed. As depicted in FIG. 2C, based on the magnetic film 20 uniformly formed on the surface of the magnetic recording medium 10, the dots 22 are formed in the data region 11, whilst the servo patterns 23 are formed in the servo regions 12.

Figure 2D:
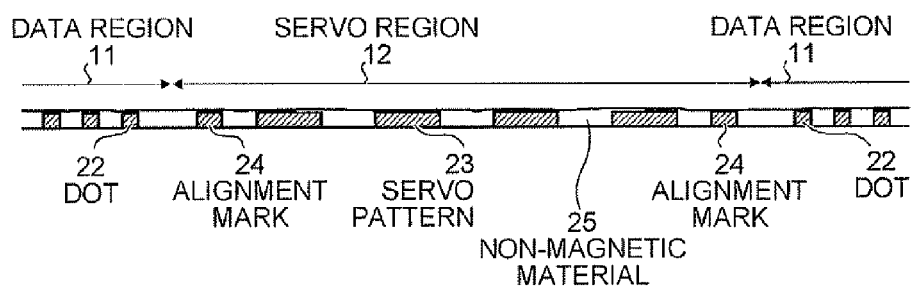
FIG. 2D is a drawing of the cross section of the magnetic recording medium at a stage where the medium is filled with a non-magnetic material.

FIG. 2D is a drawing of the cross section of the magnetic recording medium 10 at a stage where the medium is filled with a non-magnetic material. On the surface of the magnetic recording medium 10 where the dots 22 and the servo patterns 23 are formed, as depicted in FIG. 2D, sputtering of a non-magnetic material or the like is performed, thereby filling the portion other than the dots 22 and the servo patterns 23 with a non-magnetic material 25.

Figure 2E:
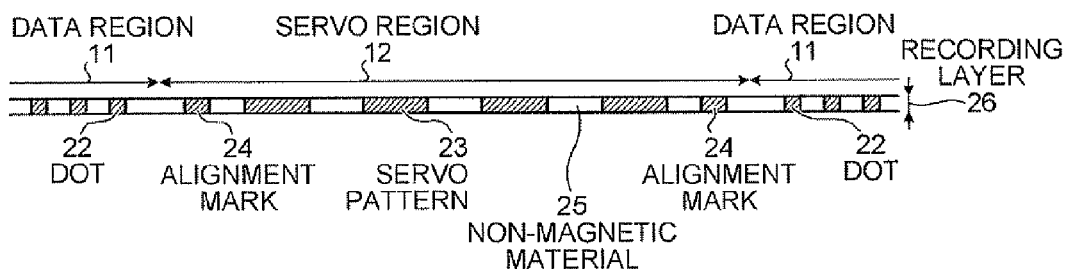
FIG. 2E is a drawing of the cross section of the magnetic recording medium at a stage where the filled non-magnetic material is planarized.

FIG. 2E is a drawing of the cross section of the magnetic recording medium 10 at a stage where the filled non-magnetic material is planarized. On the surface of the magnetic recording medium 10 filled with the non-magnetic material, Chemical Mechanical Polishing or the like is performed. With this, as depicted in FIG. 2E, the non-magnetic material 25 is planarized, thereby forming a recording layer 26.

Figure 2F:
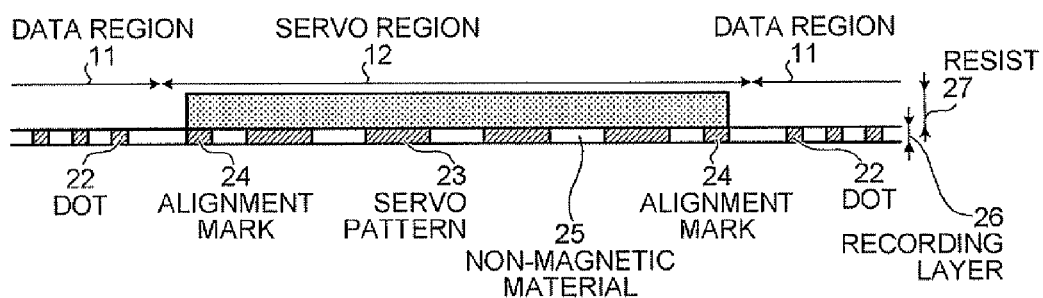
FIG. 2F is a drawing of the cross section of the magnetic recording medium at a stage where a resist is formed for controlling ion permeation.

FIG. 2F is a drawing of the cross section of the magnetic recording medium 10 at a stage where a resist 27 is formed for controlling ion permeation. As depicted in FIG. 2F, on the servo regions 12 of the magnetic recording medium 10 where the recording layer 26 is formed, the resist 27 is formed. The resist 27 controls permeation of ions applied onto the surface of the magnetic recording medium 10 in a subsequent manufacturing process. The resist 27 is formed through photolithography, such as nano-imprint lithography or mirror projection technique. In the present embodiment, as depicted in FIG. 2B, the predetermined alignment marks 24 are also formed at the time of forming the dots 22 and the servo patterns 23. With these alignment marks 24, registration of the imprint mold or a photo mask onto the magnetic recording medium 10 can be accurately performed. Here, at a boundary between the data region 11 and the servo region 12, a space is provided for the purpose of preventing erase of the servo patterns by the magnetic head. Thus, the imprint mold or the photo mask is not required to be registered onto the surface of the magnetic recording medium 10 with accuracy at a nanometer level.

Figure 2G:
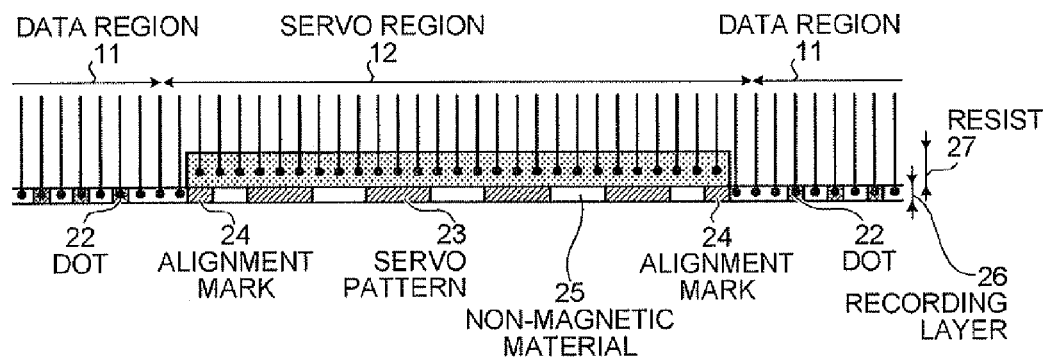
FIG. 2G is a drawing of the cross section of the magnetic recording medium at a stage where the coercive force of dots is weakened.

FIG. 2G is a drawing of the cross section of the magnetic recording medium 10 at a stage where the coercive force of dots is weakened. As depicted in FIG. 2G, onto the surface of the magnetic recording medium 10 having formed thereon the resist 27 for controlling ion permeation, ions for decreasing an anisotropic magnetic field of the magnetic material are applied. Ions are not implanted onto the servo patterns 23 in the servo regions 12 because of the resist 27, but ions are implanted on the dots 22 in the data regions 11. As a result, crystal magnetic anisotropy of the dots 22 is changed, decreasing the anisotropic magnetic field with respect to the magnetization in a direction vertical to the surface of the magnetic recording medium 10. As a result of decreasing the anisotropic magnetic field, the coercive force is decreased.

Meanwhile, in the magnetic material, as the anisotropic magnetic field is decreased by ion implantation, magnetization is also decreased. At this time, how the anisotropic magnetic field is decreased and how magnetization is decreased differ from each other, and are determined by a combination of the magnetic material and ions. FIG. 3 is a drawing of a relation between the amount of ions implanted to the magnetic material and the anisotropic magnetic field of the magnetic material and a relation between the amount of ions and magnetization. In the first embodiment, as depicted in FIG. 3, as the ion implantation amount increases, a combination of a magnetic material and ions allowing the anisotropic magnetic field to be decreased faster than the magnetization is preferably used. For example, as the magnetic film 20 depicted in FIG. 2A, a multi-layered film is used having a film made of an alloy containing cobalt and platinum or a film mainly made of cobalt, and a film containing any one or more of gold, silver, platinum, and palladium are alternately layered. In this case, for example, ions containing any one or more of oxygen, nitrogen, carbon, and boron are selected.

Figure 2H:
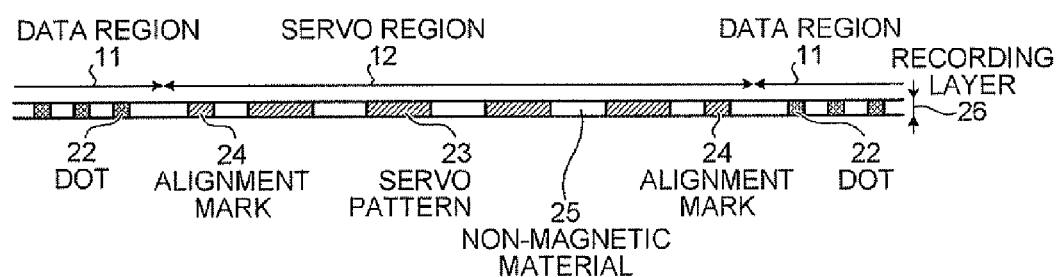
FIG. 2H is a drawing of the cross section of the magnetic recording medium at a stage where the resist is removed.

FIG. 2H is a drawing of the cross section of the magnetic recording medium 10 at a stage where the resist is removed. As depicted in FIG. 2H, in the magnetic recording medium 10 with the coercive force of the dots is weakened, the dots 22 and the servo patterns 23 are formed of the same magnetic material. Also, with ion implantation to the dots 22, the coercive force of the dots 22 has a relatively low value so as to allow data deletion and rewrite by the magnetic head. On the other hand, as a result of controlling ion permeation by the resist, the servo patterns 23 do not receive ion implantation, and therefore have still a coercive force in a direction vertical to the surface of the magnetic recording medium 10 so as not to depend on shape magnetic anisotropy. In this manner, the magnetic recording medium 10 is manufactured with the servo patterns 23 in the servo region 12 having a stronger coercive force than that of the dots 22 in the data regions 11.

Meanwhile, depending on the combination of the magnetic material and ions, the anisotropic magnetic field can be increased. In this case, as the magnetic material of the magnetic film 20 formed at the stage depicted in FIG. 2A, a magnetic material having a property in which the anisotropic magnetic field is increased due to ion implantation is used. In the following, the cross section along the line segment AB in the magnetic recording medium 10 depicted in FIG. 1 is explained in the manufacturing order, and a method of manufacturing the magnetic recording medium 10 using the increase of the anisotropic magnetic field is explained. As for the stages until filling with the non-magnetic material, the manufacturing procedure is similar to that explained by using FIGS. 2A to 2D except the magnetic material for use in forming the magnetic film 20, and therefore is not explained herein.

Figure 4A:
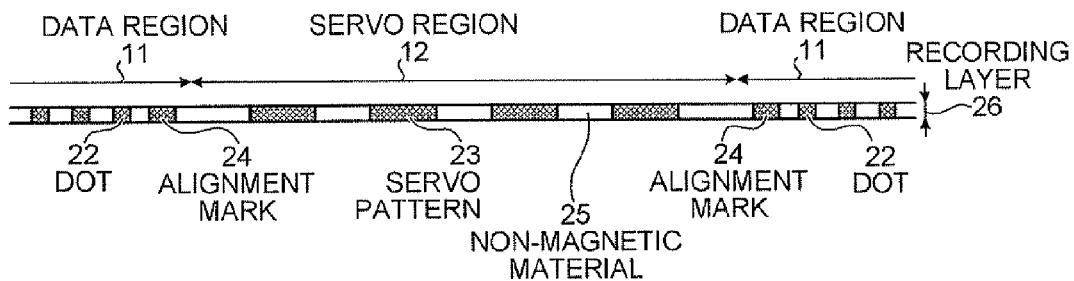
FIG. 4A is a drawing of the cross section of the magnetic recording medium at a stage where filled non-magnetic material is planarized.

FIG. 4A is a drawing of the cross section of the magnetic recording medium 10 at a stage where filled non-magnetic material is planarized. By performing CMP or the like on the surface of the magnetic recording medium 10, the non-magnetic material 25 is planarized, thereby forming the recording layer 26, as depicted in FIG. 4A. At this time, the coercive force of the dots 22 is within a range where data deletion and rewrite by the magnetic head is possible. With the coercive force of the servo patterns 23 at this time, the servo patterns 23 are stable in a direction vertical to the surface of the magnetic recording medium 10 and are not magnetized.

Figure 4B:
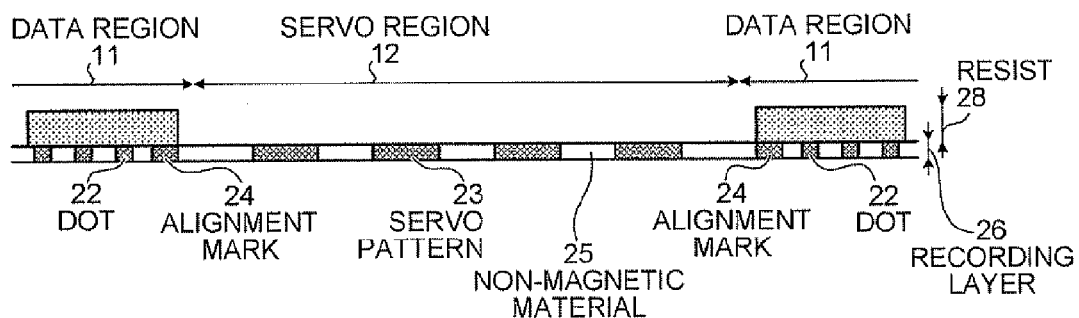
FIG. 4B is a drawing of the cross section of the magnetic recording medium at a stage where a resist is formed for controlling ion permeation.

FIG. 4B is a drawing of the cross section of the magnetic recording medium 10 at a stage where a resist is formed for controlling ion permeation. On the magnetic recording medium 10 having the recording layer 26 formed thereon, a resist 28 is formed. The resist 28 controls permeation of ions applied to the surface of the magnetic recording medium 10 at a subsequent stage. When a decrease of the anisotropic magnetic field is used, the resist 27 is formed on the servo regions 12. When an increase of the anisotropic magnetic field is used, the resist 28 is formed on the data regions 11.

Figure 4C:
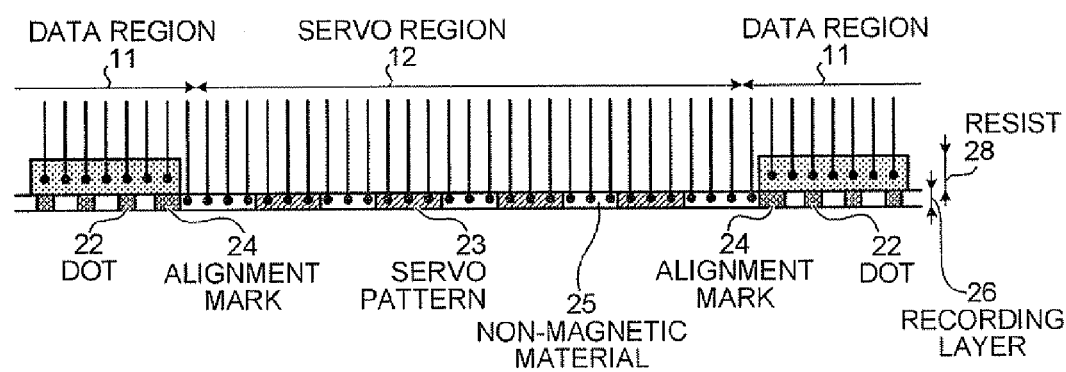
FIG. 4C is a drawing of the cross section of the magnetic recording medium at a stage where the coercive force of the servo patterns is weakened.

FIG. 4C is a drawing of the cross section of the magnetic recording medium 10 at a stage where the coercive force of the servo patterns is strengthened. As depicted in FIG. 4C, on the surface of the magnetic recording medium 10 having formed thereon the resist 28 for controlling ion permeation, ions are applied to increase the anisotropic magnetic field of the magnetic field. With ion permeation being controlled by the resist 28, ions are not implanted into the dots 22 in the data regions 11. On the other hand, as a result of ion implantation into the servo patterns 23 in the servo regions 12, crystal magnetic anisotropy of the servo pattern 23 is changed, thereby increasing the anisotropic magnetic field with respect to magnetization in a direction vertical to the surface of the magnetic recording medium 10. As a result of the increase of the anisotropic magnetic field, the coercive force is also increased.

Figure 4D:
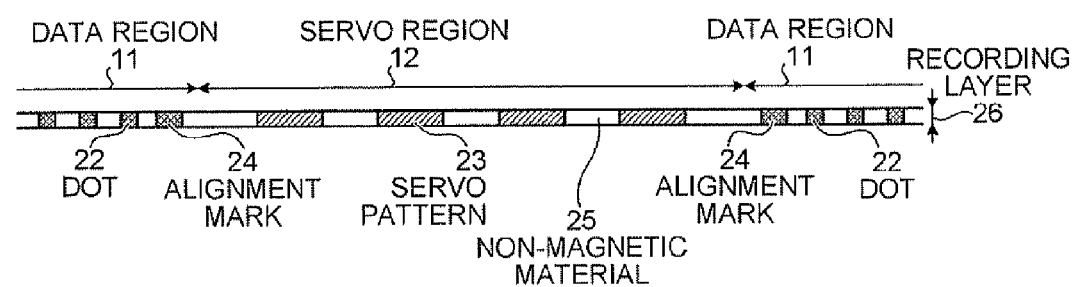
FIG. 4D is a drawing of the cross section of the magnetic recording medium at a stage where the resist is removed.

FIG. 4D is a drawing of the cross section of the magnetic recording medium 10 at a stage where the resist is removed. As depicted in FIG. 4D, in the ion-implanted servo patterns 23, the anisotropic magnetic field is increased, and has a coercive force strong enough to not depend on shape magnetic anisotropy in a direction vertical to the surface of the magnetic recording medium 10. On the other hand, since no ions are implanted into the dots 22, the dots 22 sustain a coercive force relatively low so as to allow data deletion and rewrite by the magnetic head. In this manner, the magnetic recording medium 10 is manufactured in which the coercive force of the servo patterns 23 in the servo regions 12 is stronger than that of the dots 22 in the data regions 11.

As explained above, according to the first embodiment, a recording layer is formed based on the magnetic film 20 formed at the same time, and a resist is formed on either the data regions or the servo regions in the recording layer to control ion permeation. With this, dots and servo patterns can be formed of the same magnetic material, and the magnetic recording medium with magnetization of the servo patterns sustained in the vertical direction can be manufactured.

[b] Second Embodiment

As with the first embodiment, the cross section of the magnetic recording medium 10 along the line segment AB is explained in the manufacturing order, thereby explaining a method of manufacturing the magnetic recording medium 10 according to a second embodiment.

Figure 5A:
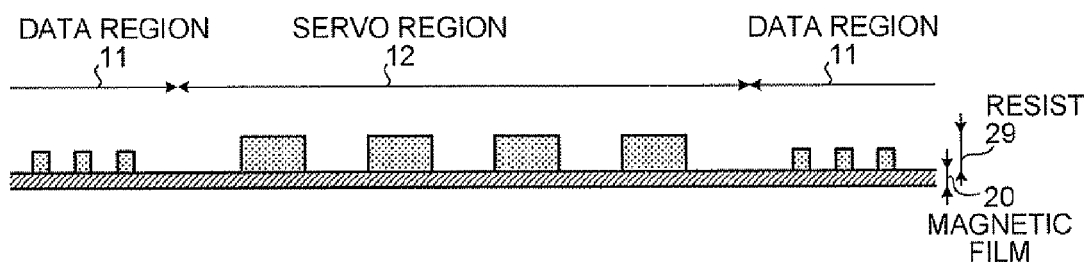
FIG. 5A is a drawing of the cross section of the magnetic recording medium at a stage where a resist is formed on a magnetic film.

FIG. 5A is a drawing of the cross section of the magnetic recording medium 10 at a stage where a resist is formed on the magnetic film 20. As with the first embodiment, the cross section of the magnetic recording medium 10 along the line segment AB depicted in FIG. 1 is schematically depicted, where the left side corresponds to the point A, whilst the right side corresponds to the point B. The same goes for other cross sections of the magnetic recording medium 10. As depicted in FIG. 5A, the magnetic recording medium 10 has the magnetic film 20 formed thereon. As a magnetic material for the magnetic film 20, if the servo patterns 15 depicted in FIG. 1 are formed, a material is used that allows crystal magnetic anisotropy high enough to stably magnetize the servo patterns 15 on the surface of the magnetic recording medium 10. At the time when the magnetic film 20 is formed, sections as the data regions 11 or the servo regions 12 are not determined.

On this magnetic film 20, a resist 29 is formed. In the servo regions 12, a resist thicker than the resist in the data regions 11 is formed. At the time of forming the resist 29, ranges depicted in FIG. 5A are determined as sections of the data regions 11 or the servo regions 12. The resist 29 controls permeation of ions applied onto the surface of the magnetic recording medium 10 at a subsequent stage.

Figure 5B:
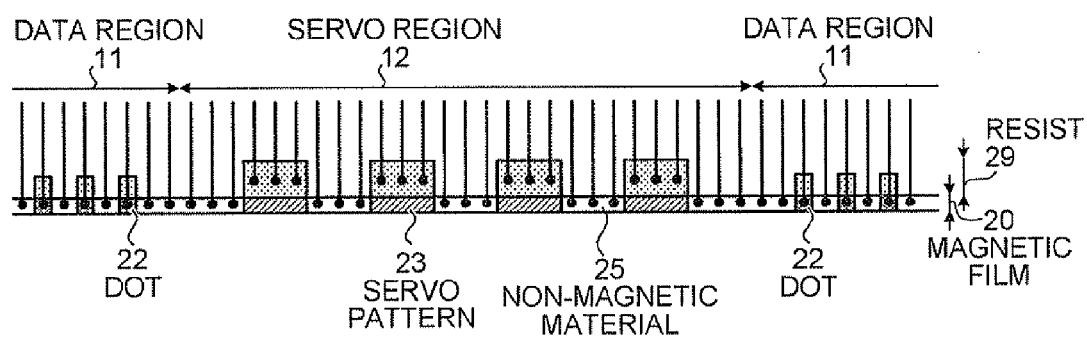
FIG. 5B is a drawing of the cross section of the magnetic recording medium at a stage where ions are applied.

FIG. 5B is a drawing of the cross section of the magnetic recording medium 10 at a stage where ions are applied. As depicted in FIG. 5B, onto the surface of the magnetic recording medium 10 having the resist 29 formed on the magnetic film 20, ions that decrease the anisotropic magnetic field of the magnetic material are applied. In a portion where the resist 29 is not formed, all ions applied are implanted. This portion completely or nearly loose magnetization to become the non-magnetic material 25. Also, into a portion in the data regions 11 where a relatively thin resist is formed, part of all ions applied is implanted. In this portion, as the anisotropic magnetic field is decreased, magnetization is decreased, and this portion becomes the dots 22. Also, no ions are implanted at all into a portion in the servo regions 12 where a relatively thick resist is formed. In this portion, the anisotropic magnetic field is sustained, and this portion becomes servo patterns 23.

Figure 5C:
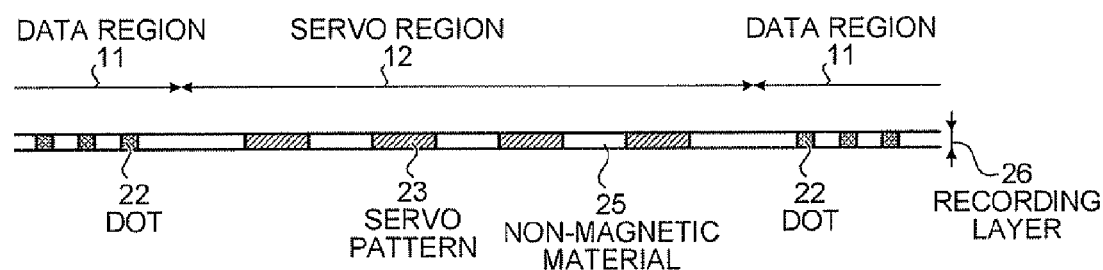
FIG. 5C is a drawing of the cross section of the magnetic recording medium at a stage where the resist is removed.

FIG. 5C is a drawing of the cross section of the magnetic recording medium 10 at a stage where the resist is removed. As depicted in FIG. 5C, the magnetic film 20 uniformly formed on the surface of the magnetic recording medium 10 at the stage depicted in FIG. 5A becomes the recording layer 26 where the non-magnetic material 25, the dots 22, and the servo patterns 23 are formed.

In this manner, in comparison with the first embodiment, the process of shaving the magnetic film and fills the shaved portion with a non-magnetic material for planarization is omitted. With this, a magnetic recording medium can be manufactured through a more simplified manufacturing procedure, with a high coercive force of the servo patterns in the servo regions compared with the dots in the data regions.

Meanwhile, before applying ions, the formed magnetic film may be physically and chemically shaved through ion milling, reactive ion etching, or the like to form dots and servo patterns. In the following, similarly, the cross section of the magnetic recording medium 10 along the line segment AB is explained in the manufacturing order, thereby explaining a method of manufacturing the magnetic recording medium 10 when the formed magnetic film is shaved to form dots and servo patterns.

Figure 6A:
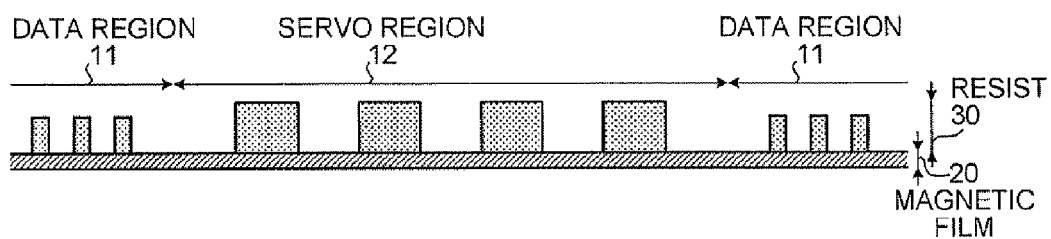
FIG. 6A is a drawing of the cross section of the magnetic recording medium at a stage where a resist is formed on a magnetic film.

FIG. 6A is a drawing of the cross section of the magnetic recording medium 10 at a stage where a resist 30 is formed on the magnetic film 20. As depicted in FIG. 6A, the magnetic recording medium 10 has the magnetic film 20 formed thereon. As a magnetic material for the magnetic film 20, if the servo patterns 15 depicted in FIG. 1 are formed, a material is used that allows crystal magnetic anisotropy high enough to stably magnetize the servo patterns 15 on the surface of the magnetic recording medium 10. At the time when the magnetic film 20 is formed, sections as the data regions 11 or the servo regions 12 are not determined.

On this magnetic film 20, the resist 30 is formed. The resist 30 is formed thicker than the resist formed in the manufacturing method without shaving the magnetic film. Also, in the servo regions 12, a resist thicker than that in the data regions 11 is formed. At the time of forming the resist 30, ranges depicted in FIG. 6A are determined as sections of the data regions 11 or the servo regions 12. The resist 30 controls permeation of ions applied onto the surface of the magnetic recording medium 10 at a subsequent stage.

Figure 6B:
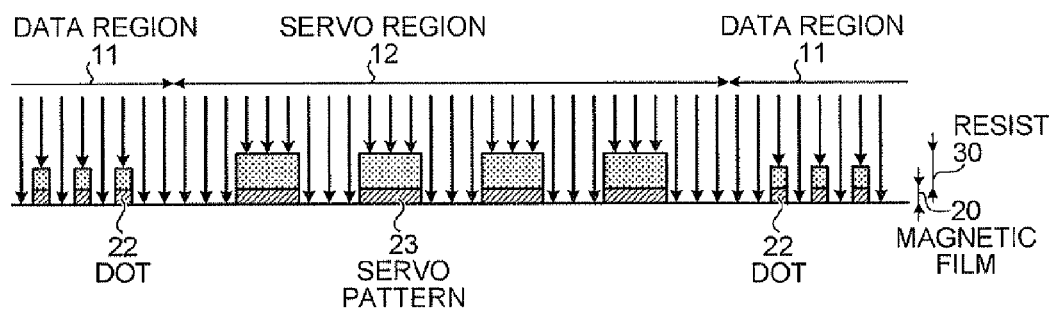
FIG. 6B is a drawing of the cross section of the magnetic recording medium at a stage where dots and servo patterns are formed.

FIG. 6B is a drawing of the cross section of the magnetic recording medium 10 at a stage where dots and servo patterns are formed. As depicted in FIG. 6B, the surface of the magnetic recording medium 10 having the resist 30 formed on the magnetic film 20 is subjected to ion milling, reactive ion etching, or the like. In the data regions 11 and the servo regions 12, the magnetic film 20 where the resist 30 is not formed is physically and chemically shaved. In a portion where the resist 30 is formed, the resist 30 is shaved in place of the magnetic film 20. Then, the dots 22 and the servo patterns 23 are formed.

Figure 6C:
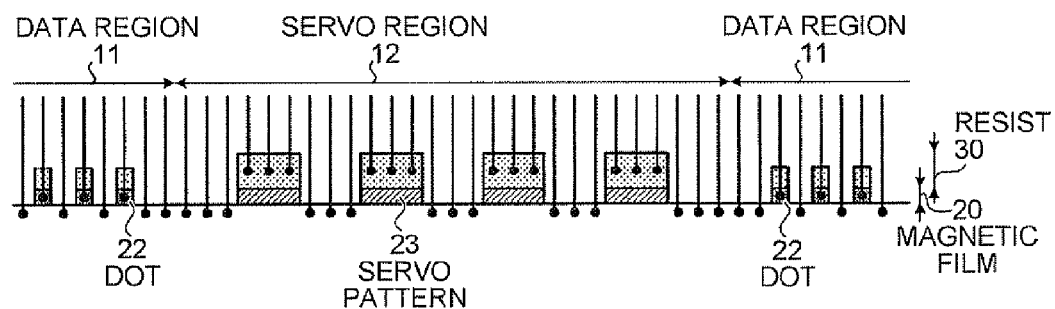
FIG. 6C is a drawing of the cross section of the magnetic recording medium at a stage where the coercive force of the servo patterns is weakened.

FIG. 6C is a drawing of the cross section of the magnetic recording medium 10 at a stage where the coercive force of the dots is weakened. As depicted in FIG. 6C, onto the magnetic recording medium 10 having the dots 22 and the servo patterns 23 formed thereon, ions are applied to decrease the anisotropic magnetic field of the magnetic material. Since a relatively thin resist is formed on the dots 22, part of all ions applied is implanted. As a result, the anisotropic magnetic field is decreased, and magnetization is also decreased.

Figure 6D:
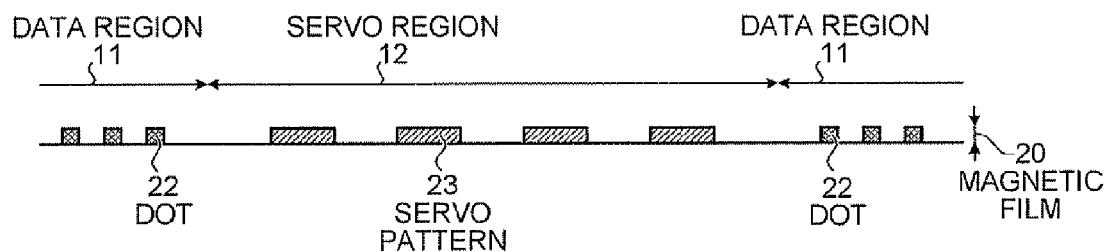
FIG. 6D is a drawing of the cross section of the magnetic recording medium at a stage where the resist is removed.

FIG. 6D is a drawing of the cross section of the magnetic recording medium 10 at a stage where the resist is removed. As depicted in FIG. 6D, based on the magnetic film 20 uniformly formed on the surface of the magnetic recording medium 10 in FIG. 6A, the dots 22 are formed in the data regions 11, whilst the servo patterns 23 are formed in the servo region.

Figure 6E:
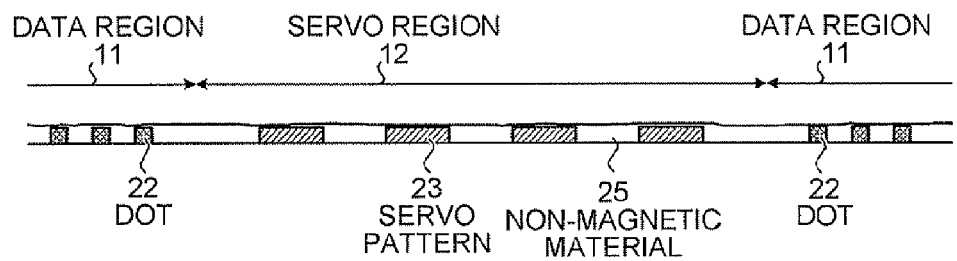
FIG. 6E is a drawing of the cross section of the magnetic recording medium at a stage where the medium is filled with a non-magnetic material.

FIG. 6E is a drawing of the cross section of the magnetic recording medium 10 at a stage where the medium is filled with a non-magnetic material. As depicted in FIG. 6E, sputtering is performed on the surface of the magnetic recording medium 10 with the resist 30 being removed, and portions other than the dots 22 and the servo patterns 23 are filled with the non-magnetic material 25.

Figure 6F:
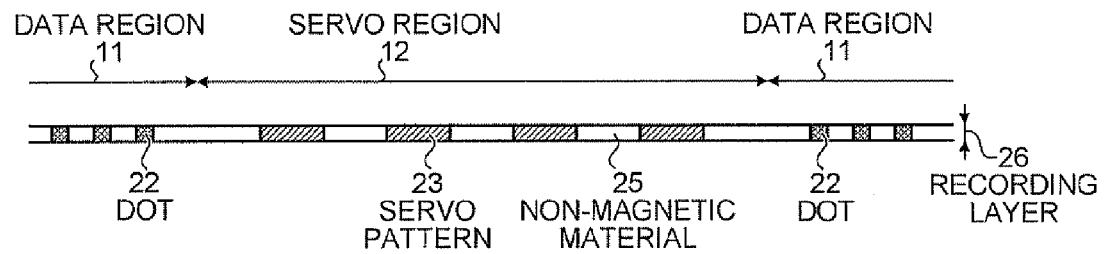
FIG. 6F is a drawing of the cross section of the magnetic recording medium at a stage where the filled non-magnetic material is planarized.

FIG. 6F is a drawing of the cross section of the magnetic recording medium 10 at a stage where the filled non-magnetic material is planarized. By performing chemical mechanical polishing (CMP) on the surface of the magnetic recording medium 10 filled with the non-magnetic material 25, the non-magnetic material 25 is planarized to form the recording layer 26, as depicted in FIG. 6F. The dots 22 and the servo patterns 23 are formed of the same magnetic material. Also, with ion implantation into the dots 22, the coercive force of the dots 22 has a relatively low value so as to allow data deletion and rewrite by the magnetic head. On the other hand, in the servo patterns 23, ion permeation is controlled by the resist and no ions are implanted. Therefore, the servo patterns 23 still have a coercive force in a direction vertical to the surface of the magnetic recording medium 10 not depending on shape magnetic anisotropy.

At the time of the stage in FIG. 6A, the magnetic film 20 may be formed of a magnetic material with a low crystal magnetic anisotropy, and a resist thinner than the data regions 11 may be formed in the servo regions 12. In this case, at the stage depicted in FIG. 6C, ions that increase the anisotropic magnetic field of the magnetic material are applied.

As explained above, in the second embodiment, unlike the first embodiment, resists different in thickness are formed in the data regions and the servo regions at the stage of forming resists on the formed magnetic film. With the resists formed at this stage, formation of dots and servo patterns and control over ion permeation are collectively performed. As a result, in comparison with the first embodiment, a step of performing registration only in the data regions or the servo regions to form a resist is omitted. With this, a magnetic recording medium where the coercive force of the servo patterns in the servo regions is stronger than the dots in the data regions can be manufactured in a simplified manufacturing process.

[c] Third Embodiment

As with the first and second embodiments, the cross section of the magnetic recording medium 10 along the line segment AB is explained in the manufacturing order, thereby explaining a method of manufacturing the magnetic recording medium 10 according to a third embodiment.

Figure 7A:
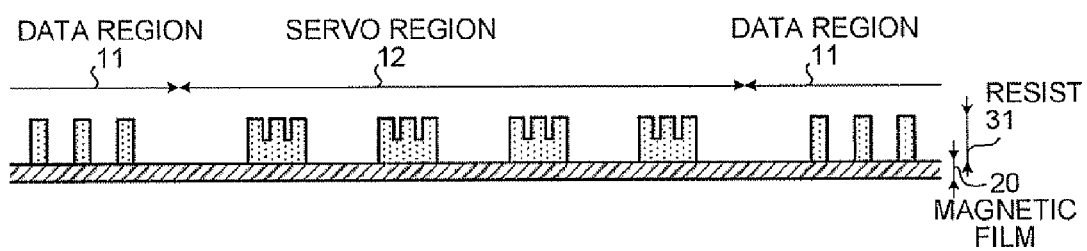
FIG. 7A is a drawing of the cross section of the magnetic recording medium at a stage where a resist is formed on a magnetic film.

FIG. 7A is a drawing of the cross section of the magnetic recording medium 10 at a stage where a resist 31 is formed on the magnetic film 20. As with the first embodiment, the cross section of the magnetic recording medium 10 along the line segment AB depicted in FIG. 1 is schematically depicted, where the left side corresponds to the point A, whilst the right side corresponds to the point B. The same goes for other cross sections of the magnetic recording medium 10. As depicted in FIG. 7A, the magnetic recording medium 10 has the magnetic film 20 formed thereon. At the time when the magnetic film 20 is formed, sections as the data regions 11 or the servo regions 12 are not determined.

Figure 8:
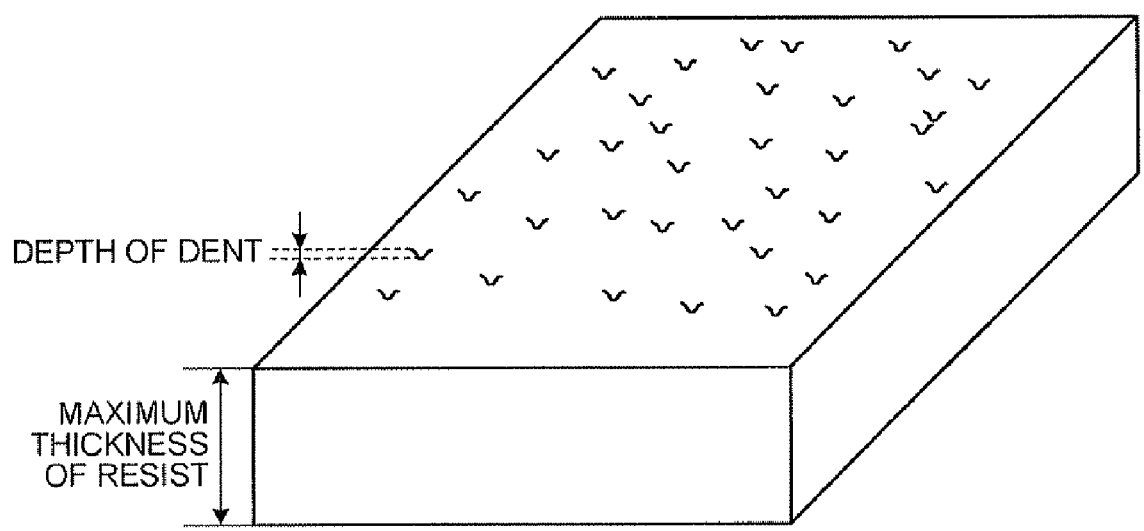
FIG. 8 is a drawing of a resist having a plurality of dents having a thickness shallower than a maximum thickness.

On this magnetic film 20, the resist 31 is formed. At the time of forming the resist 31, ranges depicted in FIG. 7A are determined as sections of the data regions 11 or the servo regions 12. Also, the resist formed in the servo regions 12 has dents. For example, these dents are scattered over a surface of the resist opposite to a surface in contact with the magnetic film, and are formed shallower than a maximum thickness of the resist, as depicted in FIG. 8.

Figure 7B:
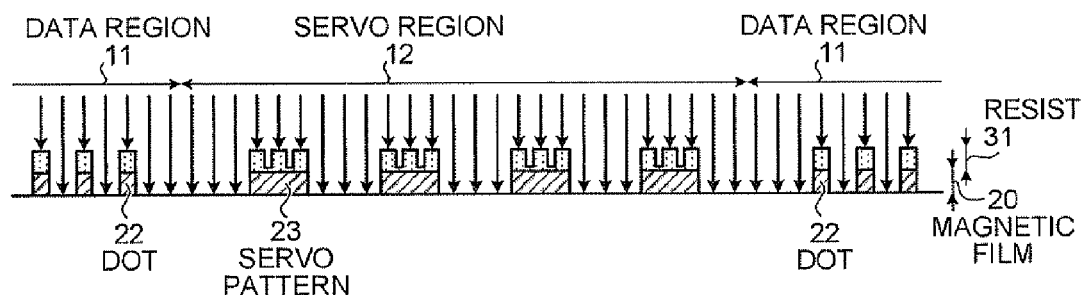
FIG. 7B is a drawing of the cross section of the magnetic recording medium at a stage where dots and servo patterns are formed.

FIG. 7B is a drawing of the cross section of the magnetic recording medium 10 at a stage where dots and servo patterns are formed. As depicted in FIG. 7B, the magnetic recording medium 10 having the resist 31 formed on the magnetic film 20 is subjected to ion milling, reactive ion etching, or the like. As a result of a portion of the magnetic film 20 where the resist 31 is not formed being physically and chemically shaved, a portion of the magnetic film 20 where the resist 31 is formed is left. In the data region 11, the left magnetic film 20 becomes the dots 22, whilst, in the servo region 12, the left magnetic film 20 becomes the servo pattern 23. At this time, the coercive force of the dots 22 is within a range where data deletion and rewrite by the magnetic head is possible. With the coercive force of the servo patterns 23 at this time, the servo patterns 23 are stable in a direction vertical to the surface of the magnetic recording medium 10 and are not magnetized.

Figure 7C:
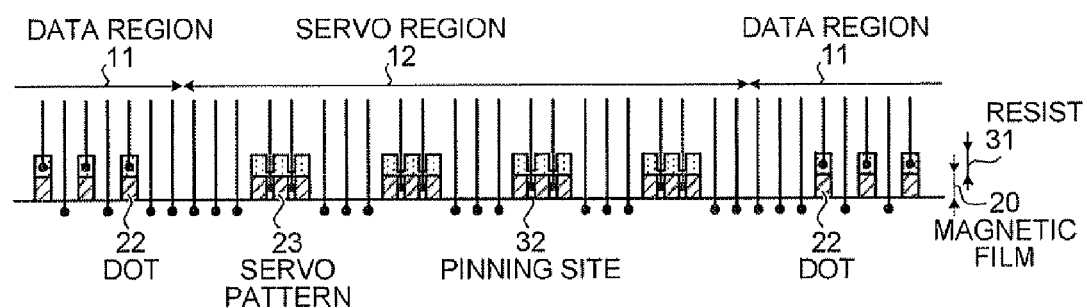
FIG. 7C is a drawing of the cross section of the magnetic recording medium at a stage where a pinning site is formed on each servo pattern.

FIG. 7C is a drawing of the cross section of the magnetic recording medium 10 at a stage where a pinning site is formed on each servo pattern. As depicted in FIG. 7C, on the surface of the magnetic recording medium 10 where the dots 22 and the servo patterns 23 are formed, ions that decrease the anisotropic magnetic field of the magnetic material are applied. In the servo patterns 23, ions are implanted from the dent portions on the resist 31 to achieve localized oxidation, nitriding, carbonization, or boronization. As a result, the servo patterns 23 have impurities and faulty portions. Such impurities and faulty portions are called the pinning sites 32, prohibiting movement of a domain wall. That is, the servo patterns 23 restrains a magnetic flux in a direction vertical to the surface of the magnetic recording medium 10 with the pinning sites 32, thereby being stably magnetized in the direction vertical to the surface of the magnetic recording medium 10.

Figure 7D:
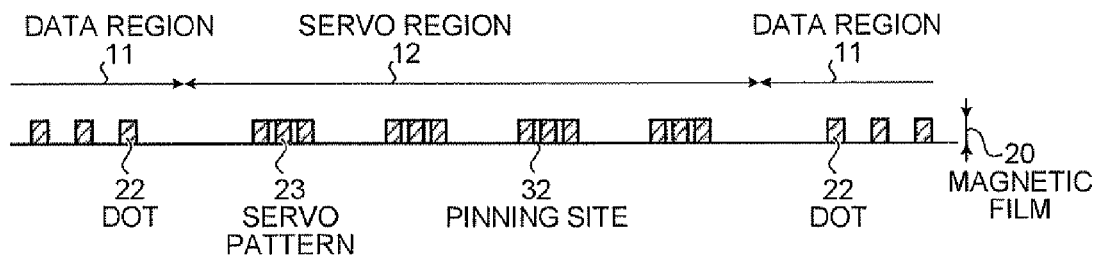
FIG. 7D is a drawing of the cross section of the magnetic recording medium at a stage where the resist is removed.

FIG. 7D is a drawing of the cross section of the magnetic recording medium 10 at a stage where the resist is removed. As depicted in FIG. 7D, based on the magnetic film 20 uniformly formed on the surface of the magnetic recording medium 10 in FIG. 7A, the dots 22 are formed in the data regions 11, whilst the servo patterns 23 are formed in the servo regions 12.

Figure 7E:
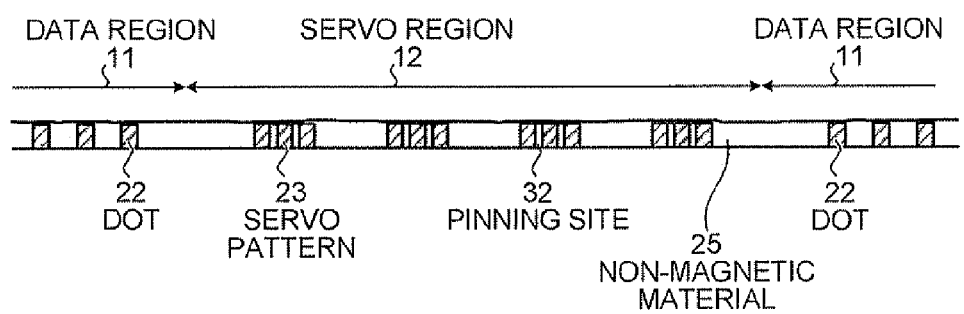
FIG. 7E is a drawing of the cross section of the magnetic recording medium at a stage where the medium is filled with a non-magnetic material.

FIG. 7E is a drawing of the cross section of the magnetic recording medium 10 at a stage where the medium is filled with a non-magnetic material. As depicted in FIG. 7E, sputtering of a non-magnetic material or the like is performed on the surface of the magnetic recording medium 10 with the resist 31 removed, and portions other than the dost 22 and the servo patterns 23 are filled with the non-magnetic material 25.

Figure 7F:
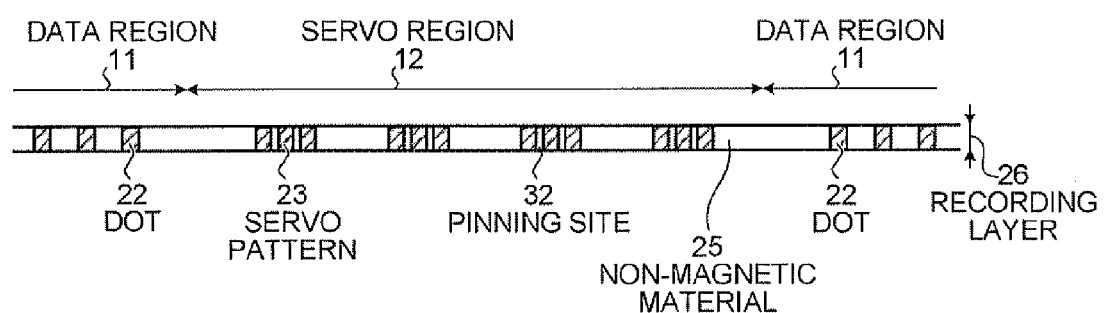
FIG. 7F is a drawing of the cross section of the magnetic recording medium at a stage where the filled non-magnetic material is planarized.

FIG. 7F is a drawing of the cross section of the magnetic recording medium 10 at a stage where the filled non-magnetic material is planarized. By performing CMP on the surface of the magnetic recording medium 10 at the stage where the filled non-magnetic material is planarized, the non-magnetic material 25 is planarized to form the recording layer 26, as depicted in FIG. 7F.

Alternatively, without forming dots and servo patterns by shaving the magnetic film, the thickness of the resist formed on the magnetic film may be adjusted at the stage depicted in FIG. 7A, and ions that decrease the anisotropic magnetic field may be applied to form a recording layer all at once.

As explained above, according to the third embodiment, a magnetic recording medium with dots and servo patterns being formed of the same magnetic material and magnetization of the servo patterns being kept in a vertical direction can be manufactured.

The disclosed medium can be manufactured with a simplified manufacturing procedure. Also, by making the crystal magnetic anisotropy of the servo patterns sufficiently strong, the servo patterns are magnetized as being stabilized in a direction vertical to the medium surface, irrespectively of the shape.

Also, the disclosed device can be manufactured with a simplified manufacturing procedure. Also, by making the crystal magnetic anisotropy of the servo patterns sufficiently strong, the servo patterns are magnetized as being stabilized in a direction vertical to the medium surface, irrespectively of the shape.

Furthermore, the disclosed manufacturing method allows the magnetic recording medium to be manufactured with a simplified manufacturing procedure, compared with a technique of using different magnetic materials to form servo patterns and dots.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of manufacturing a magnetic recording medium in which magnetic portions made of a magnetic material are separated by a non-magnetic material, the method comprising:
   forming a magnetic film for forming a recording layer;
   forming a resist on a portion to be formed by the magnetic material in a data region and on a portion to be formed by the magnetic material in a servo region, the resist controlling permeation of ions that change a coercive force of the magnetic film so that arrival ratios of ions arriving at the portions differ from each other; and
   applying the ions on the magnetic film on which the resist is formed from a plurality of dents on the resist and forming impurities and faulty portions in servo patterns so that pinning sites that prohibit movement of a domain wall are formed, wherein, in forming the resist, the plurality of dents are scattered over a surface of the resist opposite to a surface in contact with the magnetic film, and are formed shallower than a maximum thickness of the resist, wherein
   the servo patterns restrain a magnetic flux in a direction vertical to a surface of the magnetic recording medium with the pinning sites, thereby being stably magnetized in the direction vertical to the surface of the magnetic recording medium.

2. The method according to claim 1, further comprising:
   shaving a portion other than each of the portions on the magnetic film having the formed resist; and
   filling, with a non-magnetic material, the shaved portion on a lower layer of the recording layer after applying the ions.

3. A method of manufacturing a magnetic recording medium in which magnetic portions made of a magnetic material are separated by a non-magnetic material, the method comprising:
   forming a recording layer where dots made of a magnetic material are formed in data regions and where servo patterns made of the magnetic material are formed in servo regions;
   forming a resist that controls permeation of ions in the data region or the servo region in the recording layer; and
   applying the ions to the recording layer from a plurality of dents on the resist and forming impurities and faulty portions in the servo patterns so that pinning sites that prohibit movement of a domain wall are formed, wherein, in forming the resist, the plurality of dents are scattered over a surface of the resist opposite to a surface in contact with a magnetic film, and are formed shallower than a maximum thickness of the resist, wherein
   the servo patterns restrain a magnetic flux in a direction vertical to a surface of the magnetic recording medium with the pinning sites, thereby being stably magnetized in the direction vertical to the surface of the magnetic recording medium.

4. The magnetic-recording-medium manufacturing method according to claim 3, wherein
   forming the resist includes forming the resist in the servo region,
   applying the ions includes applying to the recording layer, the ions being applied to decrease a coercive force of the magnetic material.

5. The magnetic-recording-medium manufacturing method according to note 5, wherein
   forming the resist includes forming the resist in the data region,
   applying the ions includes applying to the recording layer, the ions being applied to increase a coercive force of the magnetic material.

6. A method of manufacturing a magnetic recording medium in which magnetic portions made of a magnetic material are separated by a non-magnetic material, the method comprising:
   forming, on a formed magnetic film, a resist that controls permeation of ions that change a coercive force of the magnetic film on a first portion which will become the magnetic material in a data region and a second portion which will become the magnetic material in a servo region so that an arrival ratio of the ions arriving at predetermined regions scattered in the second portion and an arrival ratio of the ions arriving at the second portion other than the predetermined region and the first portion differ from each other; and
   applying the ions to the magnetic film having the formed resist from a plurality of dents on the resist and forming impurities and faulty portions in servo patterns so that pinning sites that prohibit movement of a domain wall are formed, wherein, in forming the resist, the plurality of dents are scattered over a surface of the resist opposite to a surface in contact with the magnetic film, and are formed shallower than a maximum thickness of the resist, wherein the servo patterns restrain a magnetic flux in a direction vertical to a surface of the magnetic recording medium with the dinning sites, thereby being stably magnetized in the direction vertical to the surface of the magnetic recording medium.

* * * * *